United States Patent [19]

Ferreira et al.

[11] Patent Number: 5,576,547
[45] Date of Patent: Nov. 19, 1996

[54] POSITION CALCULATION AND ENERGY CORRECTION IN THE DIGITAL SCINTILLATION CAMERA

[75] Inventors: Abel Ferreira, Ontario; Vuk Bartulovic, Beaconsfield; Miljenko Lucic, Lachine, all of Canada

[73] Assignee: Park Medical Systems Inc., Canada

[21] Appl. No.: 362,900

[22] Filed: Dec. 23, 1994

Related U.S. Application Data

[63] Continuation-in-part of Ser. No. 97,674, Jul. 27, 1993.

[51] Int. Cl.$^6$ .................................................. G01T 1/208
[52] U.S. Cl. ................................... 250/369; 250/363.09
[58] Field of Search ............................. 250/369, 363.09, 250/363.07, 252.1

[56] References Cited

U.S. PATENT DOCUMENTS

| | | |
|---|---|---|
| 3,900,731 | 8/1975 | Chevalier et al. |
| 4,079,257 | 3/1978 | Jatteau et al. |
| 4,142,102 | 2/1979 | Lange |
| 4,212,061 | 7/1980 | Knoll et al. |
| 4,228,515 | 10/1980 | Genna et al. |
| 4,272,677 | 6/1981 | Berthold et al. |
| 4,316,257 | 2/1982 | Del Medico et al. |
| 4,323,977 | 4/1982 | Arseneau |
| 4,460,832 | 7/1984 | Bigham |
| 4,497,024 | 1/1985 | Roth |
| 4,516,025 | 5/1985 | Yamakawa et al. |
| 4,517,460 | 5/1985 | Meulenbrugge et al. |
| 4,583,187 | 4/1986 | Stoub |

(List continued on next page.)

FOREIGN PATENT DOCUMENTS

| | | |
|---|---|---|
| 1280224 | 2/1991 | Canada. |
| 0066763 | 5/1982 | European Pat. Off. |
| 0155463 | 9/1985 | European Pat. Off. |
| 0450388 | 6/1991 | European Pat. Off. |
| 0531566 | 3/1993 | European Pat. Off. |
| 2253274 | 5/1992 | United Kingdom. |

OTHER PUBLICATIONS

Basic Sciences, vol. 19, No. 7, "Investigation of Contribution Functions in a Scintillation Camera", Ken Ueda et al, pp. 825–835 (1991).

Sentinel, Digital Camera Electronics, Johnson & Johnson Company (1990).

Basic Sciences, vol. 21, No. 8, "Correction for Field Nonuniformity in Scintillation Cameras through Removal of Spatial Distortion," G. Muehlleher et al, pp.771–776.

IEEE Transactions on Nuclear Science, vol. NS–31, No. 1, Feb. 1984, New York, U.S.A. Title: "A Fast Parallel Encoding Scheme for the Anger Camera" by P.A. Seeger, pp. 274–290, Los Alamos National Laboratory, Los Alamos, NM 87545.

"Theoretical and Experimental Investigations of the Distortion in Radiation Spectra Caused by Pulse Pileup" by Q. Bristow and R. G. Harrison; Nucl. Geophys. vol. 5, No. 1/1, pp. 141–186, 5, 1991, Exeter. GB.

IEEE Transactions on Nuclear Science, vol. NS–31, No. 1, Feb. 1984; Title: "A Fast Parallel Encoding Scheme for the Anger Camera" by P. A. Seeger, New York, U.S.A.

IEEE Transactions on Nuclear Science, vol. NS–32, No. 1, Feb. 1985, Title: "One–and Two–Dimensional Position Sensitive Scintillation Detectors for Thermal Neutrons"; by R. Kurz, I. Naday, J. Schelten, New York, USA.

*Primary Examiner*—Davis L. Willis
*Assistant Examiner*—Richard Hanig
*Attorney, Agent, or Firm*—Michael D. Bednarek; Kilpatrick & Cody

[57] ABSTRACT

For accurate position calculation of scintillation events in a gamma camera, photodetector signals are processed based on small groups of photodetectors surrounding the scintillations. Relative position correction and energy correction is carried out based on rough position values relative to the group of photodetectors, taking into consideration the number of the center photodetector and the sum of all photodetector signals in the group.

14 Claims, 1 Drawing Sheet

T – SEQUENTIAL NUMBER OF CENTRAL LIGHT DETECTOR.
$E_t$ – ENERGY OR INTENSITY OF CENTRAL LIGHT DETECTOR.
$E_1...E_n$ – ENERGIES OR INTENSITIES OF LIGHT DETECTORS IN n-tuple.
$\Sigma E$ – SUM OF ALL ENERGIES IN n-tuple.
$X_c$ – RELATIVE CORRECTED X COORDINATE POSITION.
$Y_c$ – RELATIVE CORRECTED Y COORDINATE POSITION.

U.S. PATENT DOCUMENTS

| | | |
|---|---|---|
| 4,593,198 | 6/1986 | Pang et al. . |
| 4,603,256 | 7/1986 | Lelong . |
| 4,605,856 | 8/1986 | Persyk et al. . |
| 4,611,117 | 9/1986 | Seibert et al. . |
| 4,629,894 | 12/1986 | Lelong . |
| 4,634,863 | 1/1987 | Schwartz . |
| 4,677,300 | 6/1987 | Tawil et al. . |
| 4,780,823 | 6/1988 | Stoub et al. . |
| 4,812,656 | 5/1989 | Yamakawa et al. . |
| 4,860,205 | 8/1989 | Jatteau . |
| 4,881,171 | 11/1989 | Jatteau et al. . |
| 4,882,495 | 11/1989 | Tanaka . |
| 4,882,680 | 11/1989 | Bonnefoy-Claudet et al. . |
| 4,899,054 | 2/1990 | Barfod . |
| 4,900,931 | 2/1990 | Tournier et al. . |
| 4,942,291 | 3/1990 | Dietrich . |
| 5,012,082 | 5/1991 | Watanabe . |
| 5,013,919 | 5/1991 | Solomon . |
| 5,187,357 | 2/1993 | Watanabe . |
| 5,237,173 | 8/1993 | Stark et al. . |

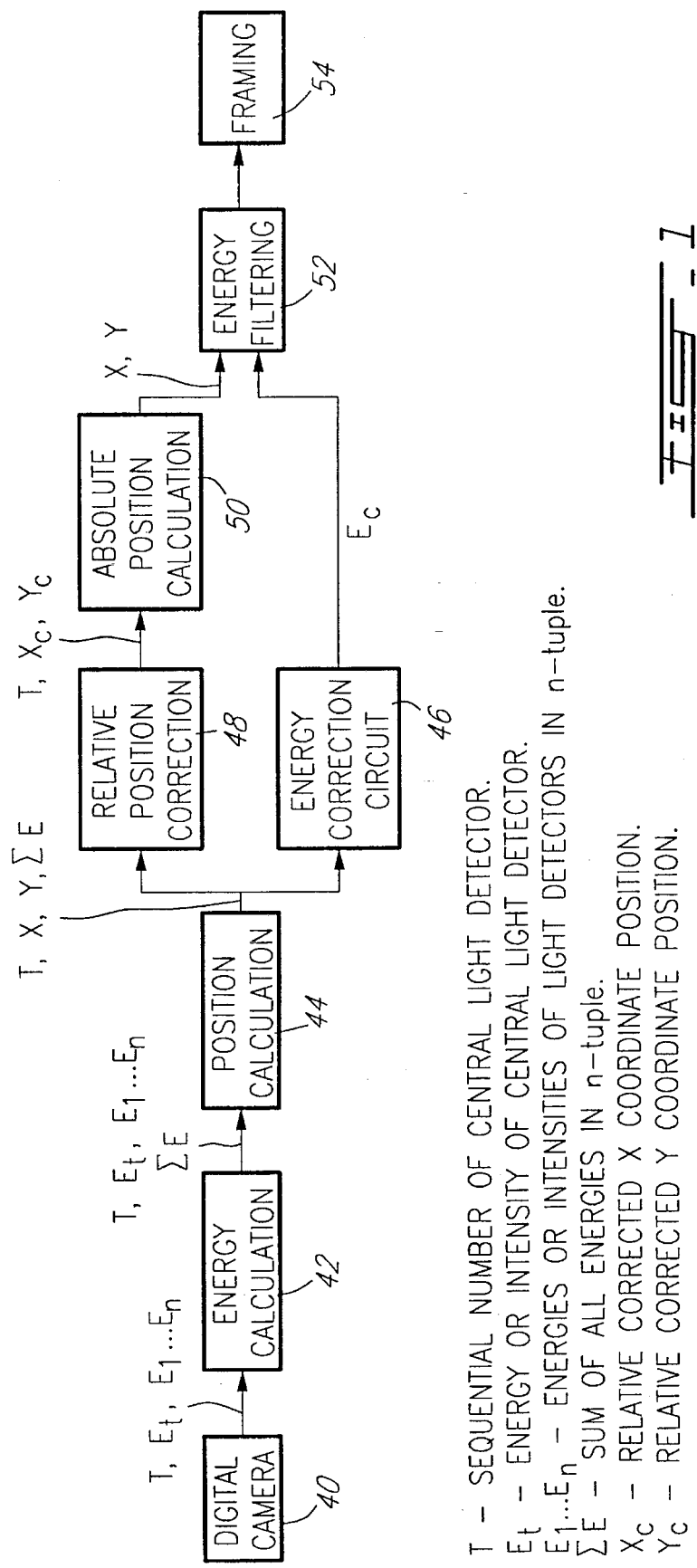

POSITION CALCULATION AND ENERGY CORRECTION IN THE DIGITAL SCINTILLATION CAMERA

This application is a continuation-in-part of U.S. patent application Ser. No. 08/097,674, filed Jul. 27, 1993.

FIELD OF INVENTION

The present invention relates to energy-independent position calculation, position correction, and energy calculation and energy correction for scintillation events in the digital scintillation camera.

BACKGROUND OF INVENTION

Scintillation cameras are well known in the art, and are used for medical diagnostics. A patient is injected, or ingests or inhales a small quantity of a radioactive isotope. Whose emission photons are detected by a scintillation medium in the camera. The scintillation is commonly a sodium iodide crystal, BGO or other, which emits a small flash or scintillation of light, in response to stimulating radiation. The intensity of the scintillation is proportional, (but not linearly) to the energy of the stimulating gamma photon.

As known in the prior art, the depth of interaction of the scintillation in the crystal is proportional to the energy of the gamma photons. As a prior art this fact prevents Anger based gamma cameras from having linear positional response for different energies. In order to produce a diagnostic medical image, scintillations having an energy which corresponds to the energy of the decay gamma photons of the radioactive isotope are detected and the intensity each scintillation in the crystal (or crystals for multicrystal cameras) is measured.

Then, the position of the scintillation calculated, and the calculated position is corrected for the scintillation. Similarly the energy is calculated and corrected. All the calculations are based on the energy intensity values of at least three light detectors (n-tuple) coupled to the surface of the scintillation medium and surrounding the point of scintillation.

SUMMARY OF THE INVENTION

It is an object of the present invention to improve scintillation camera image quality by providing a method of energy independent position calculation and corrections.

It is another object of the present to improve scintillation camera image quality by providing the method of energy calculation and corrections.

It is yet another object of the present to improve uniformity of the image which consists of the multiplicity of the small images which are tiled, to form the image of the scintillation camera.

According to one aspect of the invention, in the method of using at least three light detectors (n-tuple), an image from the scintillation camera is composed (tiled) from many small images each of which corresponds to the area of calculation of at least three light detectors (n-tuple), but preferably seven, twelve, thirteen, or nineteen light detectors. Energy calculation and correction are also done over the area of calculation of at least three light detectors (but preferably seven, twelve, thirteen, or nineteen light detectors, n-tuple).

This method can also be used to improve the position and energy correction for Anger based scintillation cameras.

According to a further aspect of the invention, there is provided the final image consisting of the multiplicity of the small images which are tiled in geometrical order to create the image of the area over the whole scintillation detector. In order to improve the uniformity of the final image, a new method is proposed. The proposed method consists of the random selection of the light detectors in the calculation if the event is located near the edge of the light detector.

BRIEF DESCRIPTION OF THE DRAWINGS

The invention will be better understood by following the non-limiting detailed description of the preferred embodiment with reference to the drawings in which:

FIG. 1 is a block schematic diagram of the scintillation camera according to the preferred embodiment.

DETAILED DESCRIPTION OF THE PREFERRED EMBODIMENT

With the reference to FIG. 1 the scintillation camera system comprises the digital camera 40, energy calculation 42, position calculation 44, energy correction circuit 46, relative position correction circuit 48, absolute position calculation circuit 50.

In its preferred embodiment, the energy calculation and correction method is digital and independent of the linearity correction, which means that it can be performed, before, or in parallel with the linearity correction. If it is performed after linearity correction then it becomes position dependent. If the energy correction is performed before the linearity correction, events which are outside the required energy window can be filtered earlier in the process.

In the preferred embodiment it is assumed that a tuning device exists, as described in commonly assigned application entitled "Photodetector Calibration in a Scintillation Camera Using a Single Light Source" Ser. No. 08/354,546 filed Dec. 14, 1994 or as described in U.S. Pat. No. 5,237,173 but not limited to such devices, and that the tuning is done before the acquisition for the energy information and positional information. The assumption is that before each acquisition, tuning is performed on the detector head, which will normalize the responses of all the light detectors. The assumption is that the detector head is digital, but not limited to being digital. (This energy correction method can be used with any detector head on the market, which can improve the characteristics of the detector heads).

Outputs from the digital detector head as seen in FIG. 1, are the following:

1) The label or sequential number associated with the light detector in the detector head T, with the highest response, or in the close neighborhood of the detector with the highest response. The light detector with the highest response or in close neighborhood will be called the center light detector. The assumption is that the absolute coordinates of each light detector is known in the detector head.

2) The response signal of the central light detector of an n-tuple, defining the n-tuple as a group of the light detectors in the neighborhood of the center light detector.

3) The responses of all light detectors in the neighboring n-tuple of the central light detector, defining the n-tuple as a group of the light detectors in the neighborhood of the center light detector.

Energy calculation circuit 42, produces a sum signal of said n-tuple of light detector signals including the signal of the central light detector.

Position calculation circuit 44, produces x and y values for the particular n-tuple of the light detectors. Center of gravity calculation can be used. Output from the position calculation is the associated label or sequential number T of the center light detector in the n-tuple.

Energy calculation and position calculation are done prior to the energy correction. Energy calculation and position calculation can be done in parallel, or the energy calculation can be part of the information that is used in positional calculation, e.g. center of gravity calculations.

The energy correction method consists of three well defined phases: first, acquisition of the energy information; second producing the energy correction tables; third, applying the energy correction 46 in real time acquisitions.

Acquisition of energy information: For each of many n-tuples with corresponding central light detector in the preferred embodiment, N by M histograms are recorded which cover the area of calculation of one n-tuple. Each histogram consist of at least 256 bins. Mistograms are addressed by the highest n bits of the x position and the highest m bits of the y position. For each event with particular position x and y, particular histogram is chosen depending on position, and the counter of that histogram is increased, depending on the energy. The number of counts in each histogram has to be statistically sufficient. Acquisition is done with the known energy, and without any structured phantoms or collimators.

For producing the energy tables; in the preferred embodiment, histograms should be filtered with a 3D filter for each n-tuple to smooth the response. It is known in the prior art that the response of the light detectors is higher in the center, and is decreases towards the periphery of the light detector, and that the response is continuous. Responses of the n-tuples are also smooth. For each n-tuple, the maximum response of each of the histograms is computed after filtering. For each histogram the factor should be computed so that the responses of all the light detectors are equal. For each n-tuple, a table of N by M factors is stored in the energy table.

When applying the energy correction 46 in real time; for each event, and depending on the central light detector of the n-tuple, address or label, and also depending on the first m bits of x coordinate and n bits of y coordinate, a particular address in the table is addressed. The computed energy, which is the sum of all the signals in the n-tuple of light detectors including the central light detector, is multiplied by the factor in the table. This produces the energy corrected value for that event.

In the preferred embodiment, the position correction method consists of four well defined phases. First, acquisition of the position information; second, producing the position correction tables for each n-tuple and third applying the relative position correction 48 in real time acquisitions. The fourth phase consists of adding the relative position of the n-tuple to the known geometric position of that n-tuple in the scintillation detector to create the absolute position 50. Assumption is that the detector head is capable of providing:

1) Associated label of the light detector in the detector head, with the highest response, or in the close neighborhood. We will call the light detector with the highest response in one event the center light detector.

2) Assumption is that the absolute coordinate of each light detector is known in the detector head.

3) Responses of all the light detectors in the neighboring n-tuple, defining the n-tuple as a group of the light detectors, in the vicinity of the center light detector.

4) In preferred embodiment n-tuple is consisting of seven, twelve, thirteen, or nineteen light detectors.

5) Definition of the event: Event is one incidence of the gamma photon producing the scintillation effect in the crystal of the detector head. Detector head outputs the label T of the center light detector, and the values of the center light detector and the intensity values of the light detectors in the neighboring n-tuple.

6) For positional calculation many methods can be used, such as center of gravity, but not limited to (for calculation of x and y coordinates). Positional calculation is the method of reducing the amount of data. At the input of the positional calculation device are the values of intensity values of all light detector of the n-tuple, and the output is the relative x and y coordinates, which are not necessary linear.

In the acquisition of position information; acquisition consists of two parts. First, acquisition with the structured phantom in front of the scintillation camera (Smith phantom), and second, acquisition without phantom, the so-called flood acquisition. Smith phantom is known in the art, and consists of a lead plate with lots of pinholes in a rectangular array. Acquisition is done with the radioactive isotope having a known energy. For each of many n-tuples with a corresponding central light detector, in the preferred embodiment, image data is acquired. The images are distorted depending on the geometric arrangement or constellation of the light detectors, the light detector and electronic channel properties, and the method of the position calculation. The position of each pinhole from the phantom is determined. The second acquisition of the flood is needed to determine that the uniformity criterion is satisfied. This means that the number of counts in each area in between the position determined by the image of the pinholes and bounded by the splines which connect all the positions of the pinholes in horizontal and vertical direction. The number of counts in each image has to be statistically sufficient to determine the position of the pinholes, or to check if the uniformity criterion is satisfied.

In producing the position correction tables; in the preferred embodiment, for each n-tuple and for each matrix which is $\frac{1}{32}$ of the size of the image of one n-tuple, coefficients for bilinear transformation are found and stored in the position correction table.

To apply the relative position correction 48 in real time; for each event, and depending on the central light detector of the n-tuple, address or label, and also depending on the first m bits of x coordinate and n bits of y coordinate, a particular address in the table is addressed. Position correction is performed by dividing the xy space of the incoming event (label, T, or sequential number of the central light detector in n-tuple, the relative positions x and y, E- total energy) into the one of the square matrices of 32×32, in the preferred embodiment. Each of the resulting matrices is bilinearly transformed to its proper position and shape. This produces the position corrected value for that event.

Circuit 50 calculates the absolute position correction in real time. For each event, after calculation of the relative addresses and depending on the central light detector of the n-tuple, address or label, the position of the n-tuple is added to the relative position inside the n-tuple to form the absolute address.

In the preferred embodiment, the energy independent position correction method consist of three well defined phases: First, acquisition of the position information; with one radioactive isotope with lower energy (approx. 100 keV), and later with the radioactive isotopes in the medium (250 keV) and high energy ranges (511 keV). Second, producing the expansion correction factors in table form or function with interpolation for the energies between the acquired energies.

In the preferred embodiment, to improve the energy independent position correction method consist of three well defined phases: First, acquisition of the position information; with one radioactive isotope with lower energy (approx. 100 keV), and later with the radioactive isotopes in the medium (250 keV) and high energy ranges (511 keV). Second, producing the expansion correction factors in table form or function with interpolation for the energies between the acquired energies. In circuit 48, the expansion correction factors are applied to the X4 values calculated in 44.

It is known as a prior art that the analog part of the electronics can have offsets, and that the response of the electronics can be dependent on the count rate and temperature. Also it is known in the prior art that the variance of the position and the energy is not the same over the area of the light detectors. These errors can degrade the uniformity of the final image of the digital scintillation camera. In the preferred embodiment the final image consists of the multiplicity of the small images which are tiled in geometrical order to create the image of the area over the whole scintillation detector. In order to improve the uniformity of the final image, a new method is proposed. The proposed method consists of the random selection of the center light detectors in the calculation if the event is located near the edge of the light detector. If the random method is not employed, tiles are connected with the butt joints, and any small errors in the position, caused by tuning process or other errors is visible as high frequency artifacts, overlap or underlap which is unacceptable for medical diagnostics. With this proposed method instead of the butt joint between the two tiling images, there is a gradual overlap from one tiled image to the other.

In the preferred embodiment, the random selection is achieved by adding a small random variance to the center photodetector signal when it is determined that the event is near the edge of the photodetector, and then determining whether the small plus (+) or minus (−) amount changes the selection of the center light detector. If so, the remainder of the processing is carried out with the newly selected center light detector, however, the random variance added to the former center light detector value is removed so as not to affect the subsequent position and energy correction. Of course, this is done within circuit 44 and merely affects the determination of the T parameter to be passed on to circuit elements 48 and 46.

Although the preferred embodiment illustrates a purely digital camera, it is to be understood that the above described methods can be easily adapted to operate when analog position calculation is used.

As can be appreciated, many variations are possible within the scope of the present invention. Combinations of various embodiments is also possible and may be advantageous depending on the exact requirements of the camera desired.

What is claimed:

1. A method of producing a position value signal in a scintillation camera having a scintillator, light detectors optically coupled to said scintillator for producing light detector signals, the method comprising the steps of:

(a) determining from said light detector signals a center light detector receiving a maximum amount of light from a scintillation;

(b) selecting a group of light detectors surrounding said center light detector;

(c) calculating based on values from said group of surrounding light detectors a relative coordinate of a scintillation relative to said center light detector;

(d) providing a transformation value table for a matrix of positions of scintillations within a scope of each of said center light detectors; and (e) transforming said relative coordinate of said scintillation using one of said transformation values from said table, said one of said transformation values having a position in said matrix corresponding to said coordinates, to obtain a value for generating said position value signal.

2. The method as claimed in claim 1, further comprising the step of adding a base coordinate of said center light detector to said position value signal to obtain a global position value signal.

3. The method as claimed in claim 1, wherein said step (d) comprises the steps of acquiring scintillation data using a structured phantom in front of said camera to obtain point position data for a known structure fixed array, and generating said transformation values based on distortion values of said position data corresponding to points of said array surrounding each position in said matrix as well as distances between each position in said matrix and the surrounding points of said array.

4. The method as claimed in claim 3, wherein said step (d) further comprises the steps of acquiring flood image intensity data, and adding to said transformation values a uniformity factor calculated based on a local gradient of said intensity data such that said transformation values also help to displace scintillation position value signals from bright spots to dimmer spots to reduce intensity anomalies in an image based on said position values.

5. The method as claimed in claim 4, further comprising the step of adding a base coordinate of said center light detector to said position value signal to obtain a global position value signal.

6. The method as claimed in claim 1, wherein said step (d) comprises the steps of acquiring flood image intensity data, and generating said transformation values based on a local gradient of said intensity data such that said transformation values help to displace scintillation position value signals from bright spots to dimmer spots to reduce intensity anomalies in an image based on said position values.

7. The method as claimed in claim 1, wherein said step (d) comprises providing a transformation value table for a plurality of scintillation energies for a matrix of positions of scintillations within a scope of each of said center light detectors, and said step (e) comprises transforming said relative coordinate of said scintillation using an interpolated value of two of said transformation values having a position in said matrix corresponding to said coordinates and relating to energies proximate an expected energy of said scintillation, to obtain a value for generating said position value signal.

8. The method as claimed in claim 5, wherein said step (d) comprises providing a transformation value table for a plurality of scintillation energies for a matrix of positions of scintillations within a scope of each of said center light detectors, and said step (e) comprises transforming said relative coordinate of said scintillation using an interpolated value of two of said transformation values having a position in said matrix corresponding to said coordinates and relating to energies proximate an expected energy of said scintillation, to obtain a value for generating said position value signal.

9. The method as claimed in claim 1, wherein said step (a) comprises randomly choosing between one of said light detectors receiving a maximum amount of light from a scintillation and neighbouring ones of said light detectors receiving almost as much light as said maximum amount, whereby scintillations occurring near a boundary between two or more of said light detectors will have a randomly selected center light detector yielding a gradual overlap from one tiled image to the other.

10. The method as claimed in claim 9, wherein said random selection is achieved by adding a small random variance to one of said light detector signals associated with said center photodetector signal for the purposes of determining whether said small random variance changes said determination of said center light detector, said small random variance ranging from a small negative value to a small positive value.

11. A method of producing and filtering a position value signal in a scintillation camera having a scintillator, light detectors optically coupled to said scintillator for producing light detector signals, the method comprising the steps of:

(a) determining from said light detector signals a center light detector receiving a maximum amount of light from a scintillation;

(b) selecting a group of light detectors surrounding said center light detector;

(c) calculating based on values from said group of surrounding light detectors relative coordinates of a scintillation relative to said center light detector;

(d) calculating a sum of said light detector signals from said group of surrounding light detectors and from said center light detector;

(e) providing an energy correction value table for a matrix of positions of scintillations within a scope of each of said center light detectors;

(f) applying one of said correction values to said sum to obtain a corrected energy sum value, said one of said correction values having a position in said matrix corresponding to said coordinate of said scintillation; and (g) filtering said relative coordinates for each scintillation based on said corrected energy sum value.

12. The method as claimed in claim 11, wherein said step (e) comprises the steps of acquiring scintillation data with a gamma ray source of known energy without use of phantoms or collimators to obtain a statistically large number of scintillation data for each position within said matrix, recording the energy of said scintillation data for each said position in the form of an energy histogram, and computing said energy correction value for said matrix using said histograms.

13. The method as claimed in claim 11, wherein said step (a) comprises randomly choosing between one of said light detectors receiving a maximum amount of light from a scintillation and neighbouring ones of said light detectors receiving almost as much light as said maximum amount, whereby scintillations occurring near a boundary between two or more of said light detectors will have a randomly selected center light detector yielding a gradual overlap from one tiled image to the other.

14. The method as claimed in claim 11, wherein said random selection is achieved by adding a small random variance to one of said light detector signals associated with said center photodetector signal for the purposes of determining whether said small random variance changes said determination of said center light detector, said small random variance ranging from a small negative value to a small positive value.

* * * * *